US009120378B2

(12) United States Patent
Deubzer et al.

(10) Patent No.: US 9,120,378 B2
(45) Date of Patent: Sep. 1, 2015

(54) DISPLAY UNIT

(76) Inventors: Andreas Deubzer, Cologne (DE); Remi Pelzman, Le Port Marly (FR); Stephane Bergot, Fresneaux Montchevreuil (FR)

( * ) Notice: Subject to any disclaimer, the term of this patent is extended or adjusted under 35 U.S.C. 154(b) by 386 days.

(21) Appl. No.: 13/508,674

(22) PCT Filed: Oct. 1, 2010

(86) PCT No.: PCT/EP2010/005991
§ 371 (c)(1),
(2), (4) Date: May 8, 2012

(87) PCT Pub. No.: WO2011/038922
PCT Pub. Date: Apr. 7, 2011

(65) Prior Publication Data
US 2012/0232778 A1   Sep. 13, 2012

(30) Foreign Application Priority Data
Oct. 2, 2009   (DE) .......................... 10 2009 048 055

(51) Int. Cl.
*G06F 19/00*   (2011.01)
*B60K 35/00*   (2006.01)
*B60K 37/02*   (2006.01)

(52) U.S. Cl.
CPC ................. *B60K 35/00* (2013.01); *B60K 37/02* (2013.01); *B60K 2350/1064* (2013.01); *B60K 2350/203* (2013.01); *B60K 2350/2008* (2013.01); *B60K 2350/2095* (2013.01); *B60K 2350/305* (2013.01); *B60K 2350/962* (2013.01)

(58) Field of Classification Search
CPC .................................. G06F 7/00; G06F 19/00
USPC ............................................ 701/36, 123, 538
See application file for complete search history.

(56) References Cited

U.S. PATENT DOCUMENTS

2009/0281715 A1*  11/2009  Paik .............................. 701/123
2010/0083894 A1*   4/2010  Birman et al. ................ 116/288

FOREIGN PATENT DOCUMENTS

| DE | 100 21 107 A1 | 11/2001 |
|---|---|---|
| DE | 10 2004 013611 A1 | 10/2005 |
| JP | 2000264093 A | 9/2000 |
| JP | 2006 184222 A | 7/2006 |
| JP | 2007256158 A | 10/2007 |
| JP | 2008230402 A | 10/2008 |
| JP | 2008232826 A | 10/2008 |
| JP | 2009101860 A | 5/2009 |

OTHER PUBLICATIONS

International Search Report for application No. PCT/EP2010/005991 mailed Jan. 25, 2011.
Chinese Office Action mailed Aug. 13, 2014 for Application No. 201080044480.1.
Japanese Office action mailed Nov. 26, 2013.
Japanese Office action mailed Apr. 1, 2014.

* cited by examiner

*Primary Examiner* — Kim T Nguyen
(74) *Attorney, Agent, or Firm* — Fletcher Yoder, P.C.

(57) ABSTRACT

The present invention relates to a display unit for a vehicle, wherein the display unit is configured for displaying a color information in dependence of a driving state information of the vehicle, wherein the driving state information is referring to the current fuel consumption of the vehicle, wherein the color information comprises a colored symbol. The present invention further relates to a vehicle comprising such a display unit.

15 Claims, 5 Drawing Sheets

DISPLAY UNIT

CROSS REFERENCE TO RELATED APPLICATIONS

This application claims priority from and the benefit of PCT Application No. PCT/EP2010/005991, filed on Oct. 1, 2010 and German Patent DE 10 2009 048 055.2, filed on Oct. 2, 2009; both entitled "DISPLAY UNIT", which are herein incorporated by reference.

BACKGROUND

The present invention relates to a display unit in a vehicle, especially a vehicle display system.

Such display units are known in numerous examples. Current vehicle display systems that are generally arranged in the area behind the steering wheel transmit to the driver information about especially mechanical or analog instruments e.g. pointer instruments, digital instruments e.g. LCD and symbols e.g. for a temperature, fuel or oil display means.

The driver of the vehicle is exposed to an information flood, although besides the display of the velocity, the temperature of the cooling water, the rpm etc. a part of the information on the display unit is only displayed optionally, i.e. if needed or according to the current situation.

Document DE 10 2004 013 611 A1 discloses a display unit for a vehicle with a coloured pointer, wherein the pointer comprises different colours in dependence of the current use of fuel. As a drawback of the prior art the colour light source must be installed in the pointer or transmitted by light conductors from the colour light source to the pointer, which is comparatively costly to install.

The object of the present invention is to provide a display unit in a vehicle that allows a quasi subconscious transmission of information, which demands only a subordinate attention of the viewer and is easy to install.

SUMMARY

This object is achieved by means of a display unit that displays information with a colour-coded symbol, wherein the information refers to the current fuel consumption.

Information referring to the fuel consumption is very important. If such information shall be displayed in a manner that the driver is influenced by the information it is necessary that there are new methods for displaying such information.

According to the present invention it is advantageously possible to transmit the information to the driver in a subconscious way using a colour change. This kind of transmission of information requires no direct eye contact to the display unit because for reception of the information it is only necessary that the driver notices the colour change in the side region of the field of vision. E.g. if the display unit is the velocity display unit of a vehicle display system the following functions are integrateable as a backlight.

In a first driving state, wherein the first driving state corresponds to a comparably low fuel consumption, (respectively as an alternative to a comparably low rpm), the backlight of the velocity display unit and/or the rpm display unit respectively a symbol arranged in an area of the velocity display unit and/or the rpm display unit is green. Alternatively to the backlight respectively to the symbol e.g. the colour of the pointer is changeable, i.e. in the first driving state the colour of the pointer is green.

In a second driving state, wherein the second driving state corresponds to a comparably middle fuel consumption, (respectively as an alternative to a comparably middle rpm), the backlight of the velocity display unit and/or the rpm display unit respectively a symbol arranged in an area of the velocity display unit and/or the rpm display unit is yellow. Alternatively to the backlight respectively to the symbol e.g. the colour of the pointer is changeable, i.e. in the first driving state the colour of the pointer is yellow.

In a third driving state, wherein the third driving state corresponds to a comparably high fuel consumption, (respectively as an alternative to a comparably high rpm), the backlight of the velocity display unit and/or the rpm display unit respectively a symbol arranged in an area of the velocity display unit and/or the rpm display unit is red. Alternatively to the backlight respectively to the symbol e.g. the colour of the pointer is changeable, i.e. in the first driving state the colour of the pointer is red.

Intermediate states of these exemplary driving states are displayable by mixed colours or colour gradients. It is kept open whether the complete display area of the display unit or only a part of the display area respectively a symbol is provided with a color changeable lighting.

In a very preferred embodiment of the invention the lighting unit comprises several independent light sources wherein at least two kinds of light sources are provided that differ by the colour of the emitted light. E.g. green, yellow and blue lighting diodes are arranged in groups side by side that are controllable independently in order to display the colours green, yellow, red or mixed colours or colour gradients across the groups of lighting diodes.

Furthermore it is preferred that the display unit comprises a light source that emits light in different colours in dependence of the control of the light source. For such a light source e.g. a light diode is adequate that in dependence of the control emits light comprising different colours. Such a display unit is especially adequate if only small space is provided for the lighting e.g. for a backlighting of a symbol.

Preferably in order to control the intensity of the light source pulse-width modulation is used.

In a further preferred embodiment of the present invention the control unit is provided for a pulsing lighting of the display area or the display surface.

Furthermore it is preferred that the display surface of the display unit, e.g. the watch face of the display unit such as a vehicle display system, is partially transilluminateable and/or translucent. Therefore it is advantageously possible to display a colour change only in predetermined structures.

The object of the present invention relates to a display unit for a vehicle, wherein the display unit is configured for displaying a colour information in dependence of a driving state information of the vehicle, wherein the driving state information is referring to the current fuel consumption of the vehicle, wherein the colour information comprises a coloured symbol.

Preferably the driving state information is referring to low/med/high fuel consumption and/or to the current rpm of the vehicle, preferably referring to low/med/high rpm of the vehicle.

Preferably the colour information comprises a coloured pointer and/or a coloured backlighting.

Preferably the colour information comprises the colours green, yellow and/or red, a colour change, a mixed colour, a colour gradient and/or a colour with different intensities.

Preferably the display unit comprises the velocity display unit and/or the rpm display unit of a vehicle display system.

Preferably the display unit comprises independently controllable colour light sources, wherein the colour light sources are preferably configured for the emission of at least two different colours.

Preferably the display unit comprises groups of colour diodes, wherein the groups are arranged side by side and preferably comprise green, yellow and/or blue diodes.

Preferably the display unit comprises a colour lighting diode configured for the emission of different colours.

Preferably pulse-width modulation is used for controlling the colour intensity of the colour information.

Preferably the display unit comprises a partial display area, wherein the partial display area is configured for displaying the colour information.

Preferably the display unit comprises a display surface, wherein the display surface is partially transilluminateable and/or translucent.

A further object of the present invention relates to a vehicle comprising a display unit according to one of the preceding embodiments, wherein the display unit is configured for displaying a colour information in dependence of a driving state information of the vehicle, wherein the driving state information is referring to the current fuel consumption of the vehicle, wherein the colour information comprises a coloured symbol.

Exemplary embodiments of the present invention are depicted in the following figures and, along with further advantages and details, further clarified.

DRAWINGS

DETAILED DESCRIPTION

Figure 1:
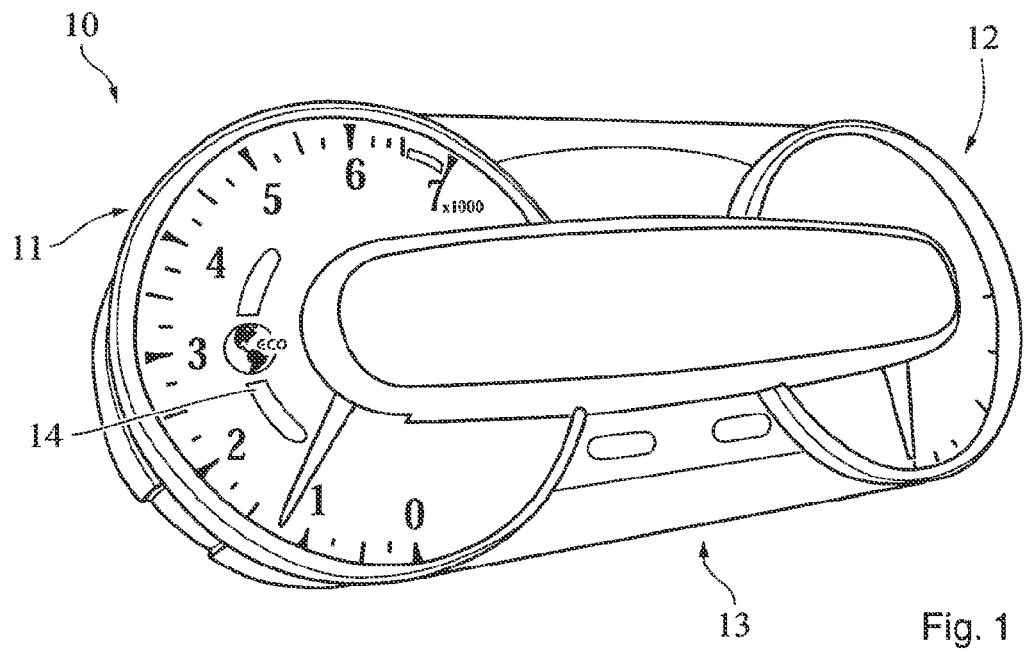
FIGS. 1 to 4 show a first embodiment of the present invention.

FIG. 1 shows a schematic perspective view of a display unit 10 (in the following also called vehicle display system 10) for a vehicle, especially a motor vehicle.

Figure 2:
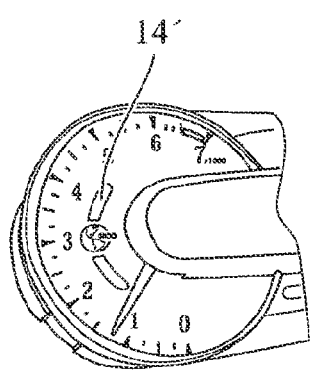
Figure 3:
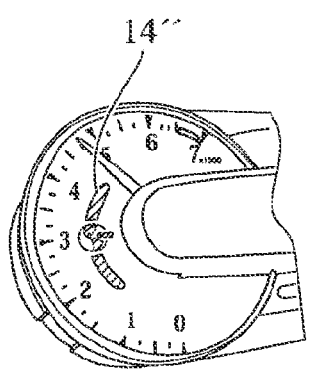
Figure 4:
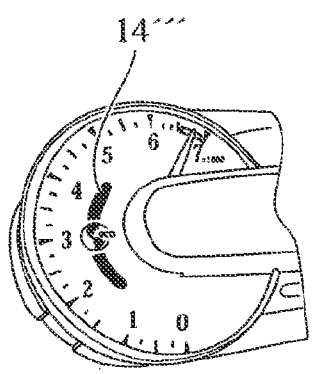

The display unit 10 comprises a first display area 11, a second display area 12 and a third display area 13. For example the first display area 11 is used for the display of the rpm, the second display area 12 is used for the display of the velocity and the third display area 13 is used for the display of a further information. An information 14 about the driving state (in the following also called drive state), especially referring to the current fuel consumption, is depicted as symbol 14 exemplary in the first display area 11. This symbol 14 or the information 14 is depicted in an enlarged view in FIG. 2 in a first example of the first embodiment (corresponding to the first drive state) with an exemplary green representation 14' of the symbol 14. This symbol 14 or the information 14 is depicted in an enlarged view in FIG. 3 in a second example of the first embodiment (corresponding to the second drive state) with an exemplary yellow representation 14" of the symbol 14. This symbol 14 or the information 14 is depicted in an enlarged view in FIG. 4 in a third example of the first embodiment (corresponding to the third drive state) with an exemplary red representation 14''' of the symbol 14.

Figure 5:
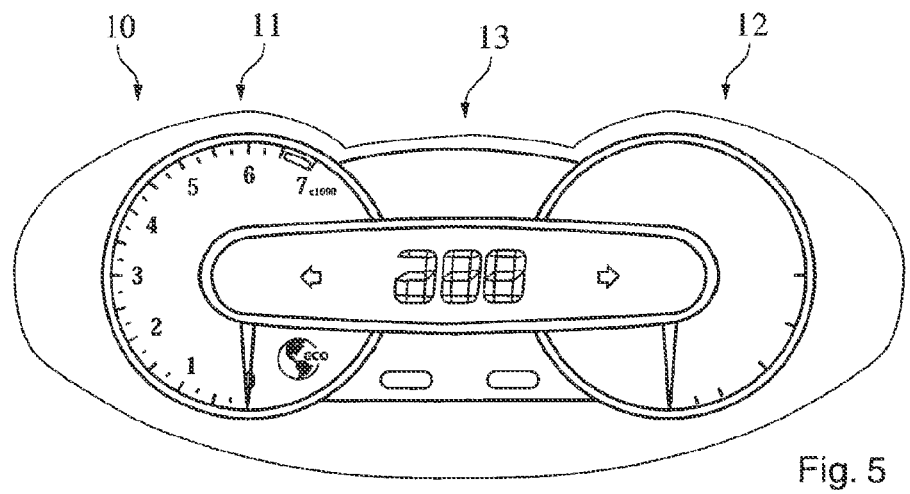
FIGS. 5 to 8 show a second embodiment of the present invention.
Figures 6, 7, 8:
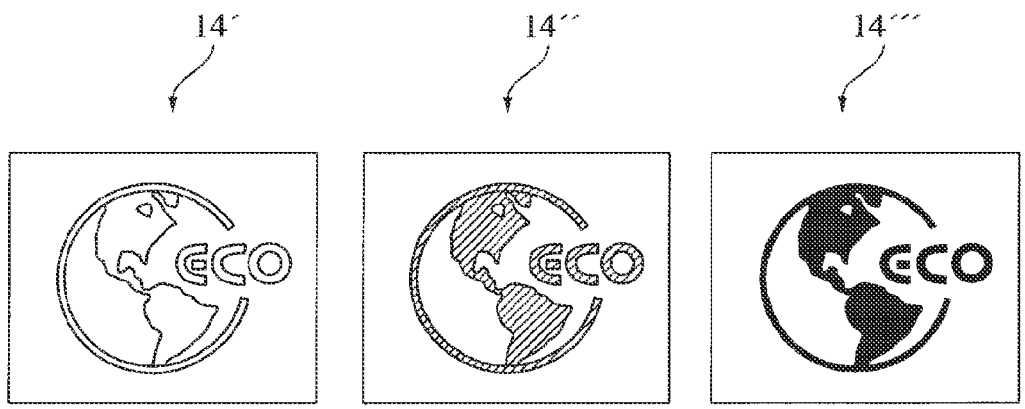

FIG. 5 shows a schematic perspective view of the display unit 10 for a vehicle, especially a motor vehicle. The display unit 10 comprises the first display area 11, the second display area 12 and the third display area 13. The information 14 about the driving state is depicted as symbol 14 in the first display area 11. This symbol 14 or the information 14 is depicted in an enlarged view in FIG. 6 in a first example of the second embodiment (corresponding to the first drive state) with an exemplary green representation 14' of the symbol 14. This symbol 14 or the information 14 is depicted in an enlarged view in FIG. 7 in a second example of the second embodiment (corresponding to the second drive state) with an exemplary yellow representation 14" of the symbol 14. This symbol 14 or the information 14 is depicted in an enlarged view in FIG. 8 in a third example of the second embodiment (corresponding to the third drive state) with an exemplary red representation 14''' of the symbol 14.

Figure 9:
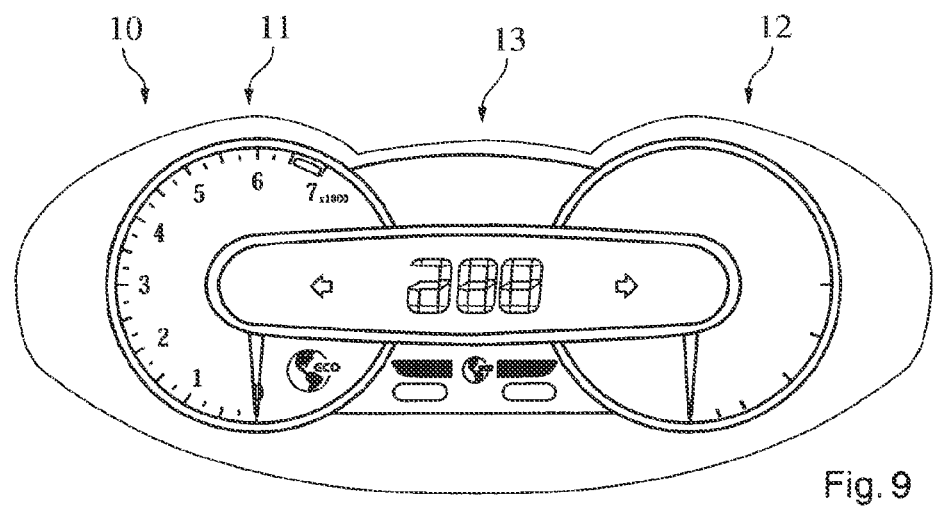
FIGS. 9 to 12 show a third embodiment of the present invention.
Figure 10:
Figure 11:
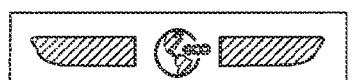
Figure 12:
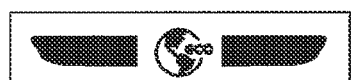

FIG. 9 shows a schematic perspective view of the display unit 10 for a vehicle, especially a motor vehicle. The display unit 10 comprises the first display area 11, the second display area 12 and the third display area 13. The information 14 about the driving state is depicted as symbol 14 in the third display area 13. This symbol 14 or the information 14 is depicted in an enlarged view in FIG. 10 in a first example of the third embodiment (corresponding to the first drive state) with an exemplary green representation 14' of the symbol 14. This symbol 14 or the information 14 is depicted in an enlarged view in FIG. 11 in a second example of the third embodiment (corresponding to the second drive state) with an exemplary yellow representation 14" of the symbol 14. This symbol 14 or the information 14 is depicted in an enlarged view in FIG. 12 in a third example of the third embodiment (corresponding to the third drive state) with an exemplary red representation 14''' of the symbol 14.

Figure 13:
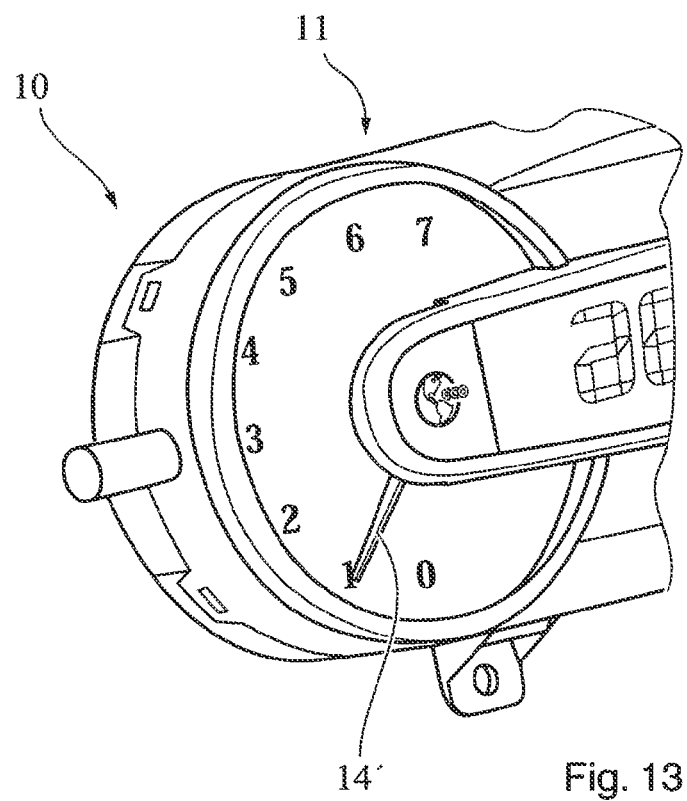
FIGS. 13 to 15 show a fourth embodiment of the present invention.
Figure 14:
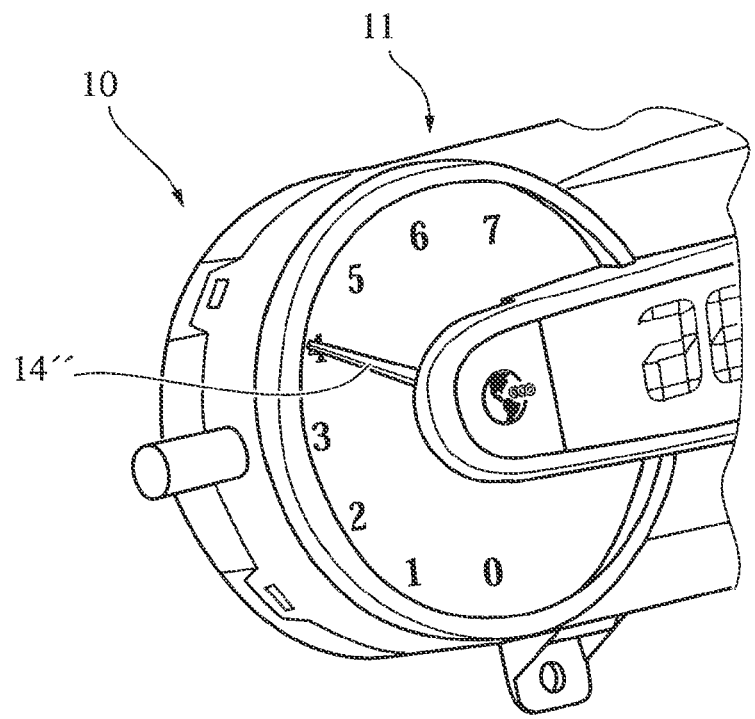
Figure 15:
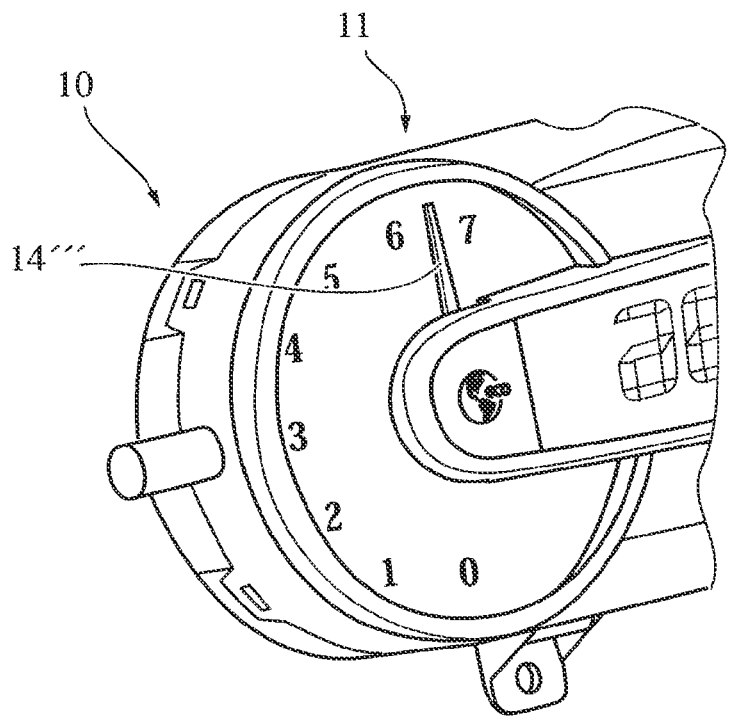

According to a fourth embodiment the pointer of the display area 11, 12, 13 changes its colour. This is e.g. depicted in FIGS. 13, 14 and 15 for the first display area. In FIG. 13 the symbol according to the drive state is depicted in a first example of the fourth embodiment (corresponding to the first drive state) with an exemplary green representation 14' of the symbol. In FIG. 14 the symbol according to the drive state is depicted in a second example of the fourth embodiment (corresponding to the second drive state) with an exemplary yellow representation 14" of the symbol. In FIG. 15 the symbol according to the drive state is depicted in a third example of the fourth embodiment (corresponding to the third drive state) with an exemplary red representation 14''' of the symbol.

The invention claimed is:

1. A display unit for a vehicle, comprising:
 a first display area;
 a second display area;
 a third display area, wherein the display unit is configured to display color elements, the display unit comprises a color-coding system configured to color-code the color elements based upon a driving state of the vehicle, the driving state comprises current fuel consumption of the vehicle, and the color elements comprise:
  a colored pointer configured to change color based upon the driving state;
  a colored symbol comprising a color changeable lighting configured to change color based upon the driving state; and
  a colored backlighting configured to change color based upon the driving state;
  wherein the colored pointer is configured to be arranged in the first display area or the second display area, the colored symbol is configured to be arranged in the third display area, and the colored backlighting is an element of the first display area, the second display area, the third display area, or some combination thereof;
  wherein the color-coding system comprises a first independently controllable color light source and a second independently controllable color light source, the first and second independently controllable color light sources are configured to emit at least two different colors in response to control of the color light sources, the first independently controllable color light source is configured to change the color of the colored pointer, and the second independently controllable color light source is configured to change the color of the colored backlighting;

wherein the third display area comprises a display surface, the third display area at least partially superposes the colored pointer of the first display area or of the second display area so that the colored symbol of the third display area at least partially overlaps the colored pointer of the first display area or of the second display area, and the display surface is at least partially transilluminateable, translucent, or some combination thereof, such that the colored pointer and the colored symbol are illuminated by the first independently controllable color light source.

2. The display unit of claim 1, wherein a control unit is configured to provide a pulsing lighting to the first display area, the second display area, the third display area, the display surface, or some combination thereof.

3. The display unit of claim 2, wherein predetermined structures are configured to display color information.

4. The display unit of claim 1, wherein the color-coding system is configured to color-code the color elements by changing a color, by mixing colors, by providing a color gradient, by providing a color with different intensities, or some combination thereof.

5. The display unit of claim 1, wherein the color-coding system is configured to control the independently controllable color light sources via a pulse-width modulation signal.

6. The display unit of claim 1, wherein the independently controllable color light sources comprise color lighting diodes configured to emit different colors.

7. The display unit of claim 1, wherein the independently controllable color light sources comprise groups of color diodes comprising diodes colored green, yellow, blue, or some combination thereof, wherein the groups are arranged side by side.

8. The display unit of claim 1, wherein a selected color of the colored pointer, the colored symbol, or the colored backlighting corresponds to the current fuel consumption, current revolutions of an engine of the vehicle, or some combination thereof.

9. The display unit of claim 1, wherein the first display area is configured to display engine revolutions, the second display area is configured to display vehicle velocity, and the third display area is configured to display further information.

10. A vehicle, comprising:
a display unit, comprising:
 a first display area;
 a second display area; and
 a third display area, wherein the first display area is configured to display engine revolutions, the second display area is configured to display vehicle velocity, and the third display area is configured to display further information, the display unit is configured to display color elements, the display unit comprises a color-coding system configured to color-code the color elements based upon a driving state of the vehicle, the driving state comprises current fuel consumption of the vehicle, and the color elements comprise:
  a colored pointer configured to change color based upon the driving state;
  a colored symbol comprising a color changeable lighting configured to change color based upon the driving state; and
  a colored backlighting configured to change color based upon the driving state;
 wherein the colored pointer is configured to be arranged in the first display area or the second display area, the colored symbol is configured to be arranged in the third display area, and the colored backlighting is an element of the first display area, the second display area, the third display area, or some combination thereof;
 wherein the color-coding system comprises a first independently controllable color light source and a second independently controllable color light source, the first and second independently controllable color light sources are configured to emit at least two different colors in response to control of the color light sources, the first independently controllable color light source is configured to change the color of the colored pointer, and the second independently controllable color light source is configured to change the color of the colored backlighting, and a control unit is configured to provide a pulsing lighting to the first display area, the second display area, the third display area, or some combination thereof;
 wherein the third display area comprises a display surface, the third display area at least partially superposes the colored pointer of the first display area or of the second display area so that the colored symbol of the third display area at least partially overlaps the colored pointer of the first display area or of the second display area, and the display surface is at least partially transilluminateable, translucent, or some combination thereof, such that the colored pointer and the colored symbol are illuminated by the first independently controllable color light source.

11. A method for color-coding color elements in a display unit for a vehicle based upon a driving state of the vehicle, comprising:
changing a first color of a colored pointer based upon the driving state via a first independently controllable color light source;
changing a second color of a colored symbol based upon the driving state via the first independently controllable color light source; and
changing a third color of a colored backlighting based upon the driving state via a second independently controllable color light source;
wherein the driving state comprises current fuel consumption of the vehicle, the colored pointer is configured to be arranged in a first display area or a second display area, the colored symbol is configured to be arranged in a third display area, and the colored backlighting is part of the first display area, the second display area, the third display area, or some combination thereof;
wherein the third display area comprises a display surface, the third display area at least partially superposes the colored pointer of the first display area or of the second display area so that the colored symbol of the third display area at least partially overlaps the colored pointer of the first display area or of the second display area, and the display surface is at least partially transilluminateable, translucent, or some combination thereof, such that the colored pointer and the colored symbol are illuminated by the first independently controllable color light source.

12. The method of claim 11, comprising:

emitting at least two different first colors based upon control of the first independently controllable color light source; and emitting at least two different second colors based upon control of the second independently controllable color light source.

13. The method of claim 12 comprising:

mixing the at least two different first colors, emitting a first gradient of the at least two different first colors, emitting the at least two different first colors with different first intensities, or some combination thereof; and mixing the at least two different second colors, emitting a second gradient of the at least two different second colors, emitting the at least two different second colors with different second intensities, or some combination thereof.

14. The method of claim 12, comprising:

assigning the at least two different first colors of the colored pointer to a first driving state comprising a first current fuel consumption, a first current revolutions of an engine of the vehicle, or some combination thereof; and assigning the at least two different second colors of the colored backlighting to a third driving state comprising a third current fuel consumption, a third current revolutions of the engine of the vehicle, or some combination thereof.

15. The method of claim 11, comprising:

controlling a first pulsing lighting of the first display area, a second pulsing lighting of the second display area, a third pulsing lighting of the third display area, a fourth pulsing lighting of the display surface, or some combination thereof.

* * * * *